May 11, 1965   J. D. HARMS   3,183,286
METHOD OF MAKING UNIT FILTER ASSEMBLIES
Filed July 31, 1961   2 Sheets-Sheet 1

INVENTOR.
JOHN D. HARMS
BY
Ralph B. Brick
ATTORNEY

INVENTOR.
JOHN D. HARMS
BY
Ralph C. Brick
ATTORNEY

United States Patent Office 3,183,286
Patented May 11, 1965

3,183,286
METHOD OF MAKING UNIT FILTER ASSEMBLIES
John D. Harms, Valley Station, Ky., assignor to American Air Filter Company, Inc., Louisville, Ky., a corporation of Delaware
Filed July 31, 1961, Ser. No. 128,047
8 Claims. (Cl. 264—45)

The present invention relates to filters and more particularly to an improved method for making unit filter assemblies.

It long has been the practice in the art of gas cleaning to manufacture unit filter assemblies by constructing border frame members from any one of several well known, substantially rigid materials such as metal, wood or cardboard. These border frame members have been of channel-shape cross-section to accommodate the edges of filter medium pieces disposed within and supported thereby. Not only has the fabrication of such filter assemblies been expensive and time consuming, but in addition, the numerous steps that have been required in the manufacture of the assemblies have limited efficient and time saving mass production techniques. Although changes have been made in manufacturing techniques for certain select types of filters (for example, the more recent use of certain plastic compounds as edge sealing devices for cartridge-type pleated annular filters), for the most part, the cumbersome and comparatively inefficient aforedescribed method of manufacture of unit filter assemblies has prevailed.

In accordance with the features of the present invention, a new and efficient method for manufacturing filter assemblies of the unit type is presented, the inventive method being readily and economically adapted to mass production techniques, requiring a minimum of steps, a minimum of time and a minimum of operating parts to accomplish the same. Further, the present invention provides an improved, reinforced filter assembly which includes a border frame arrangement that serves to support filter medium disposed therein in firm manner but yet which is light in weight and which is non-combustible.

Various other features of the present invention will become obvious to one skilled in the art upon reading the disclosure set forth herein.

More particularly, the present invention produces an improved filter assembly comprising an open end border frame member of gas expanded plastic compound and a sheet of filter medium disposed therein with edge portions of the medium embedded in the plastic compound to be supported thereby. In addition, the present invention provides a method of forming such a filter assembly including the steps of supporting the sheet of filter medium in a support zone in the form it is to have in final assembly with edge portions thereof extending into a preselected border frame zone adjacent the support zone, introducing a controlled quantity of expansible plastic compound into the border frame zone in reduced bulk form, confining the boundaries of the border frame zone, expanding the plastic compound in bulk form to the limits of confinement with the edge portions of the filter medium embedded in the plastic compound, and allowing the plastic compound to set before releasing the finished filter assembly.

It is to be understood that various changes can be made in the several steps of the method disclosed herein without departing from the scope or spirit of the present invention.

Referring to the drawings.

Figure 1:
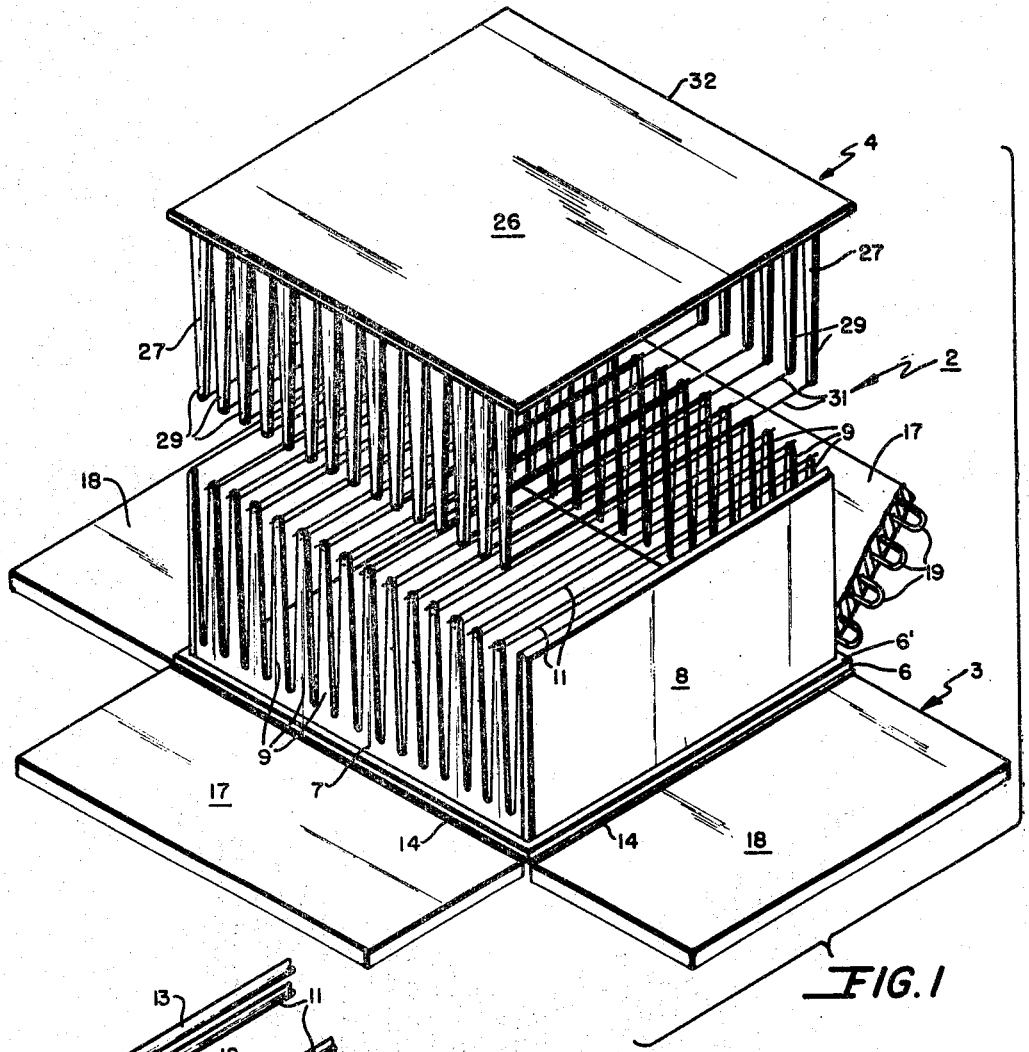
FIGURE 1 is an isometric view in exploded form of a jig which can be used in carrying out the method of the present invention.

In carrying out the method of the present invention, a filter medium support zone in the form of mold forming jig assembly 2 is provided (FIGURE 1). It is to be understood that the present invention is not limited to the particular jig assembly described herein but that other types of jigs can be used to support the medium, the type of jig used depending upon the desired shape of the final filter assembly to be manufactured.

Figure 2:
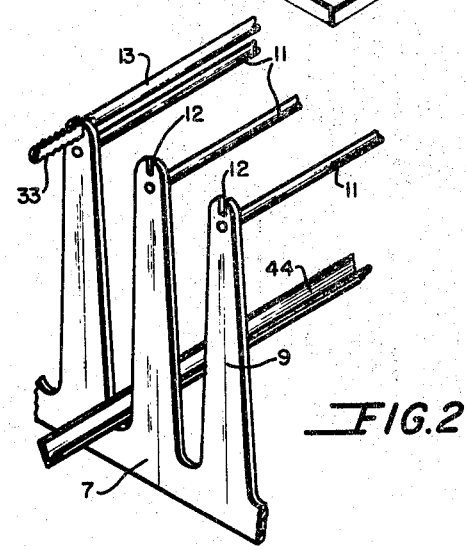
FIGURE 2 is an enlarged isometric side view of a portion of the female member of the jig in FIGURE 1.
Figure 3:
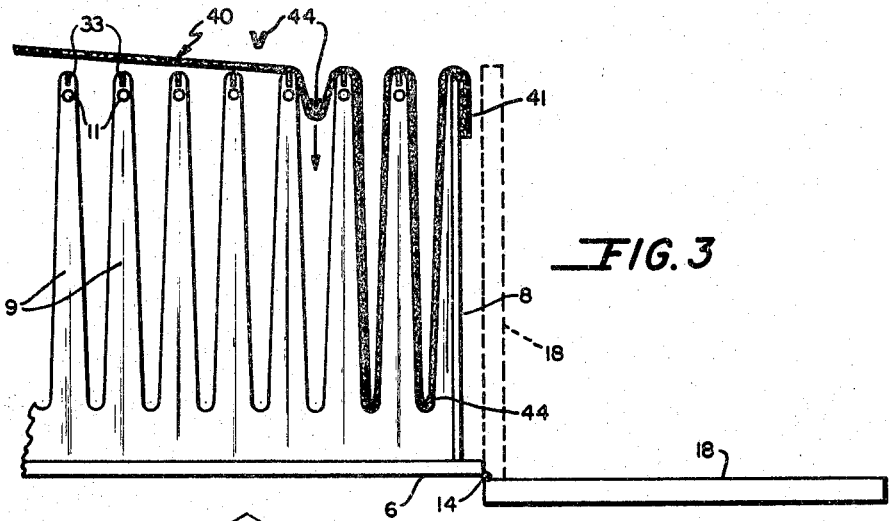
FIGURE 3 is an enlarged side elevational view of a portion of the female member of the jig of FIGURE 1, disclosing the member during filter medium loading operations.

As can be seen in the drawings, jig assembly 2 which forms a partially confined mold includes female jig member 3 and interlocking male jig member 4, the jig members being constructed from some suitable heat conducting metal. Advantageously, aluminum which is light in weight, which is readily fabricated to form, and which has excellent heat conducting properties can be used. Female jig member 3 includes rectangular base portion 6 having peripheral skirt portion 6' and having attached thereto and extending therefrom a pair of spaced inner side walls 7 and a pair of spaced inner end panel walls 8. Inner side walls 7 are contoured to present a plurality of corresponding and spaced fingers 9, with the fingers of one inner side wall being connected to corresponding fingers of the other inner side wall by fixed rod members 11 extending therebetween. It is to be noted that each of fingers 9 is provided at its apex with a slot 12 (FIGURE 2), slots 12 in opposed fingers serving to accommodate floating rod members 13, the purpose of which is hereinafter described more fully.

Pivotally hinged to base portion 6 by means of suitable hinge members 14 are a pair of spaced outer side walls 17 and a pair of spaced outer end walls 18. It is to be noted that outer side and end wall pairs 17 and 18 are mounted to provide a border frame space between their inner faces and the outer faces of corresponding inner side and inner end wall pairs 7 and 8 when outer wall pairs 17 and 18 are pivoted about hinges 14 to a position parallel to such inner wall pairs. This space serves as a border frame mold to accommodate material for a border frame during manufacturing operations, as described hereinafter. It also is to be noted (FIGURE 1) that outer wall pairs 17 and 18 include heating coils 19 disposed within the walls and connected to some suitable source of electric power through a suitable take-off or header conduit inserted in base portion 6 (not shown).

Male jig member 4, which is similar to female jig member 3, includes a rectangular base portion 26, the base portion 26 having attached thereto and extending therefrom a pair of spaced side walls 27. Side walls 27 are contoured to present a plurality of correspondingly spaced fingers 29, with the fingers of one side wall being connected to corresponding fingers of the other side wall by fixed rod members 31 extending therebetween. It is to be noted that fingers 29 of male jig member 4 are dimensioned to interlock with fingers 9 of female jig member 3 and it further is to be noted that base portion 26 of male member jig 4 is dimensioned to include a peripheral skirt 32 which faces peripheral skirt 6' of jig member 3 and which covers and confines the border frame mold formed between the inner and outer wall pairs of female jig member 3 when male jig member 4 is interlocked with such female jig member.

In carrying out the inventive method with the apparatus aforedescribed, a plurality of rod members 13 (as aforementioned) are floatingly inserted in slots 12 of opposed fingers 9 to extend in spaced, parallel relationship with respect to each other between the apices of opposed inner side walls 7 of female jig member 3. Rod members 13 can be so dimensioned that the ends thereof project into the aforementioned border frame mold which is formed between the inner and outer walls of the jig member 3. In this connection, it is to be noted that the ends of rod members 13 can be flattened and can be provided with serrations 33 to improve the gripping qualities with the plastic compound in which the rod ends become embedded (as described hereinafter).

Figure 4:
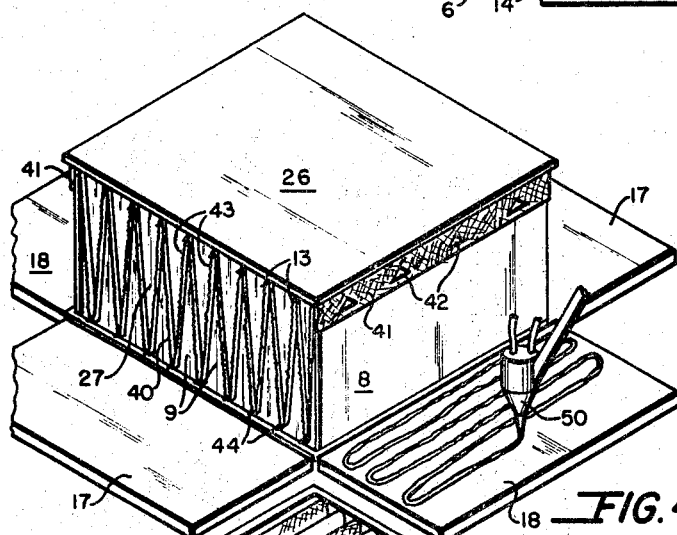
FIGURE 4 is a partially broken away, reduced isometric view of the jig of FIGURES 1 to 3, disclosing the jig in medium loaded condition with plastic compound being applied.
Figure 5:
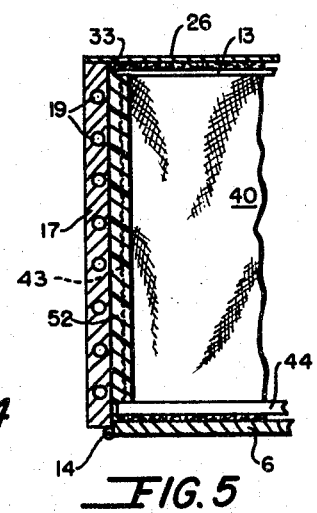
FIGURE 5 is a cross-sectional view of a portion of the jig along a side wall after plastic compound has been applied and the border frame zone confined by the jig; and, FIGURE 6 is a partially broken away, reduced isometric view of a unit filter assembly formed by the jig of FIGURES 1–5.
Figure 6:
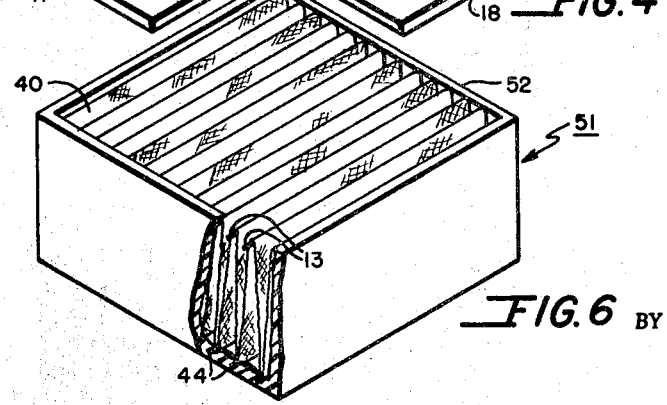

Once rod members 13 have been appropriately inserted in slots 12, a suitable sheet of filter medium 40 can be loaded into female jig member 3, either by hand or by an apparatus similar to that disclosed in U.S. Patent No. 2,238,251, issued to V. Dahlman on April 15, 1941. Medium 40, which can be any one of a number of well known filter mediums in the art and which advantageously can be of fine fiber glass, is so loaded as to have its ends 41 extend over the inner end panel walls 8 of jig member 3 into the aforementioned border frame zone. To afford additional gripping qualities between medium 40 and the plastic compound in which the medium is embedded (as described hereinafter), ends 41 are provided with a plurality of apertures 42 therein. In this connection, it is to be noted that medium 40 is of such a width that side portions 43 thereof extend beyond the inner side walls 7 of jig member 3 into the border frame mold (FIGURE 4). Like rod members 13, side portions 43 also can be serrated to improve the gripping efficiency of these side portions with the plastic compound in which they become embedded and which they reinforce.

It is to be noted that as medium 40 is loaded into female jig member 3 the medium takes on a pleated form as it follows the contour of fingers 9. Rods 44 of V-shape cross-section are then inserted in floating position into the valleys of the formed pleats. These rods, like rods 13, can be dimensioned to have their ends extend beyond the inner side walls 7 of jig 3 so as to fall within the border frame mold and thus become embedded in the plastic compound (as described hereinafter). It further is to be noted that since rods 44 are of V-shape cross-section, firmer embedding of the rods in the compound can be obtained.

Once a sheet of medium 40 is appropriately loaded in female jig member 3, male jig member 4 is interlocked with the female member so that fingers 29 of jig 4 interlock with the fingers 9 of jig 3 to hold the medium in position. Outer side and end walls 17 and 18 are then pivoted about hinges 14 to a position where the plastic compound can be applied to the inner faces of these outer walls. Advantageously, walls 17 and 18 are positioned in a plane perpendicular to the plane determining the inner side and end walls 7 and 8 when the plastic compound is applied. In accordance with the present invention the plastic compound applied is of expansible type and, advantageously, is a chain-extending, cross-linking, gas forming polymerizable plastic compound, which at ambient temperatures has a viscous liquid or paste form. It has been found that foam polyurethane plastic which can be produced from toluene di-isocyanate (or any other di-isocyanate) and a polyether resin mixed with a suitable catalyst (tertiary amine, for example), silicone and propellant (trichlorofluoro methane, for example) to set up in desired form, advantageously rigid, can be utilized in providing a border frame member. Although a polyether resin is considered to be most advantageous, it is to be understood that a polyester or polyol resin can be used instead. The foam polyurethane, itself, is known in the chemical arts and, therefore, it is not set forth in further detail herein.

The expansible plastic compound can be applied by means of mixer 50 in snake-like, viscous form at ambient temperatures along the inner faces of outer side and outer end panel walls 17 and 18, these walls being heated by means of electric heating coils 19. Advantageously, the plastic compound is of such a nature that when it is applied at ambient temperatures it is in unexpanded or reduced bulk form and when it is heated it expands to approximately twenty times its original form, the quantity of compound applied being determined by its expanding nature and the volume of the border frame to be filled. Once the compound has been applied to the outer side and end panel walls and before the compound expands by reason of the heat in the walls, the walls are pivoted about hinges 14 to form the aforedescribed confined border frame mold, the walls being clamped in position by some suitable clamping means (not shown). After a certain period of time, as determined by the chemistry of the plastic compound and the heat of walls 17 and 18, the applied plastic compound expands from unexpanded or reduced bulk form to expanded or increased bulk form, filling out the border frame mold enclosed between inner and outer walls of female jig member 3 and the peripheral skirts of the base portions of male jig member 4 and female jig member 3. After a suitable period of time, also determined by the chemistry of the expansible plastic compound, the compound sets. At this point, outer side and end walls 17 and 18 are pivoted away and jig 4 is removed from jig 3. Then, final filter assembly 51, having a rigid plastic polyurethane border frame 52 with the edges of filter medium 40 embedded therein in sealed relationship therewith, as well as the ends of support rods 13 and 44, is removed from supporting jig 3.

It is to be understood that to facilitate removal of final filter assembly 51, a suitable release agent can be applied where required to the jig assembly before the expansible plastic compound is introduced to the jig as aforedescribed.

The invention claimed is:

1. A method of forming a filter assembly of a type including an open-end border frame member having a sheet of filter medium disposed therein and supported thereby comprising the steps of supporting a sheet of porous filter medium on a support jig in the form it is to have in final assembly with peripheral edge portions thereof extending into a partially assembled and partially confined border frame mold adjacent to and surrounding said support jig, applying a controlled quantity of expansible plastic compound along one side of said border frame mold in unexpanded form, assembling and completely confining the overall boundaries of said border frame mold with said unexpanded compound disposed therein, expanding said plastic compound to the limits of confinement of said mold so that said porous edge portions of said filter medium are embedded in the expanded compound, and allowing said plastic compound to set in such embedded relationship before releasing the finished filter assembly.

2. A method of forming a filter assembly of a type including an open-end border frame member having a sheet of filter medium disposed therein and supported thereby comprising the steps of loading a sheet of porous filter medium on a support jig in the form it is to have upon final assembly with peripheral edge portions thereof extending beyond said jig into an adjacent partially confined border frame mold, applying a controlled quantity of chain-extending, cross-linking, gas-forming polymerizable plastic compound along one side of said border frame mold in unexpanded form, completely confining the overall boundaries of said border frame mold, expanding said plastic compound to the limits of confinement of said mold so that said porous edge portions of said filter medium are embedded in the expanded compound, allowing said plastic compound to set in such embedded relationship, and releasing the finished filter assembly from said support jig.

3. The method of claim 2, said plastic compound being a foam polyurethane.

4. A method of forming a filter assembly of a type including an open-end border frame member having a sheet of filter medium disposed therein and supported thereby comprising the steps of loading a sheet of porous filter medium on a support jig in the form it is to have upon final assembly with its peripheral edges extending beyond said jig into an adjacent partially confined border frame mold, introducing a controlled quantity of a chain-extending, cross-linking, gas-forming polymerizable plastic compound along one side of said border frame mold in unexpanded form at ambient temperatures, completely confining the overall boundaries of said border frame mold, heating said plastic compound to cause it to expand to the limits of confinement of said mold so that said porous edge portions of said filter are embedded in the expanded compound, allowing said plastic compound to set in such embedded relationship, and releasing the finished filter assembly from said support jig.

5. A method of forming a filter assembly of a type including an open-end border frame member having a sheet of filter medium disposed therein and supported thereby in pleated form comprising the steps of forming a sheet of porous filter medium into the pleated form it is to have at final assembly and supporting the pleated medium at its crests and valleys on a support jig with peripheral edge portions of the medium extending beyond said jig into a partially confined border frame mold adjacent said support jig, introducing a controlled quantity of expansible plastic compound along one side of said border frame mold in unexpanded form, completely confining the overall boundaries of said border frame mold with said unexpanded compound disposed therein, expanding said plastic compound to the limits of confinement of said mold so that said porous edge portions of said filter medium are embedded in the expanded compound allowing said plastic compound to set in such embedded relationship, and releasing the finished filter assembly from said support jig.

6. The method of claim 5, wherein the pleated filter medium is supported with the aid of individual rod-like members, at least some of which are floatingly mounted on said support jig with opposite ends thereof extending into the border frame mold whereby said ends become embedded in said plastic compound upon expansion of said compound to become part of the final filter.

7. A method of forming a filter assembly of a type including an open-end border frame member having a sheet of filter medium disposed therein and supported thereby in pleated form comprising the steps of inserting a sheet of porous filter medium into a disengaged female portion of an interlocking male and female pleat form support jig so that said medium conforms to the crests and valleys of said female jig portion and thus to the pleated form it is to have at final assembly with the peripheral edge portion of said medium extending beyond said jig into a partially confined border frame mold surrounding said support jig, engaging said male and female members of said support jig into interlocked relationship to hold said filter medium in fast position, introducing a controlled quantity of expansible plastic compound along one side of said border frame mold in unexpanded form, completely confining the overall boundaries of said border frame mold with said unexpanded compound disposed therein, expanding said plastic compound to the limits of confinement of said mold so that said porous edge portions of said filter medium are embedded in the expanded compound, allowing said plastic compound to set in such embedded relationship, and releasing the finished filter assembly from said support jig.

8. A method of forming a filter assembly of a type including an open end border frame member having a sheet of filter medium disposed therein and supported thereby in pleated form comprising the steps of mounting an individual rod-like filter fold support member in floating position at each of the crests between end walls of a disengaged female portion of an interlocking male and female pleat form support jig with opposite ends of each of said rod-like members extending into a partially confined border frame mold adjacent said support jig, inserting a sheet of porous filter medium into said female portion of said support jig so that said medium conforms to the crests and valleys of said jig portion and thus to the pleated form it is to have at final assembly with the peripheral edge portion of said medium extending beyond said jig into said partially confined border frame mold adjacent said jig, mounting an individual rod-like filter fold support member in floating position over said filter medium at each of the valleys between end walls of said female portion of said support jig, engaging said male and female members of said support jig into interlocked relationship to hold said filter medium and rods in fast position, introducing a controlled quantity of expansible plastic compound along one side of said border frame mold in unexpanded form, completely confining the overall boundaries of said border frame mold with said unexpanded compound disposed therein, expanding said plastic compound to the limits of confinement of said mold so that said porous edge portions of said filter medium and said rod ends are embedded in the expanded compound, allowing said plastic compound to set in such embedded relationship, and releasing the finished filter assembly from said support jig.

References Cited by the Examiner

UNITED STATES PATENTS

| | | | |
|---|---|---|---|
| Re. 24,914 | 12/60 | Koenigsberg. | |
| 2,080,154 | 5/37 | Strindberg | 55—502 XR |
| 2,185,568 | 1/40 | Ratner | 264—271 XR |
| 2,394,208 | 2/46 | Schaaf | 55—514 XR |
| 2,821,764 | 1/58 | Leaky et al. | 264—257 XR |
| 2,895,174 | 7/59 | Hockett | 18—59 |
| 2,907,407 | 10/59 | Engle et al. | 183—71 |
| 2,907,408 | 10/59 | Engle et al. | 183—71 |
| 2,950,495 | 8/60 | Stingley | 264—45 XR |
| 2,965,933 | 12/60 | Kasten | 18—59 |
| 3,036,342 | 5/62 | Fino | 18—59 |

FOREIGN PATENTS

| | | |
|---|---|---|
| 738,845 | 9/43 | Germany. |
| 790,181 | 2/58 | Great Britain. |

ROBERT F. WHITE, *Primary Examiner.*

WILLIAM J. STEPHENSON, MORRIS LIEBMAN, ALEXANDER H. BRODMERKEL, *Examiners.*